United States Patent [19]

Alton

[11] 4,044,918
[45] Aug. 30, 1977

[54] HIGH TEMPERATURE, QUICK ACCESS DOOR FOR HIGH VACUUM CHAMBERS

[75] Inventor: Lynn J. Alton, Boulder Creek, Calif.

[73] Assignee: Huntington Mechanical Laboratories, Inc., Mountain View, Calif.

[21] Appl. No.: 586,961

[22] Filed: June 16, 1975

[51] Int. Cl.² .................................................. B65D 45/28
[52] U.S. Cl. ....................................... 220/314; 13/31; 220/325; 277/170; 277/236; 292/260
[58] Field of Search ............... 220/314, 316, 325, 244, 220/246, 351, 346; 277/187, 170, 236; 292/260, 256.5, 256.75, 259; 33/22, 112; 114/201 R, 16 R; 49/463, 466, 41; 13/31; 432/249

[56] References Cited

U.S. PATENT DOCUMENTS

| 457,471 | 8/1891 | Bregha | 220/314 |
|---|---|---|---|
| 725,093 | 4/1903 | Kiler | 292/260 |
| 1,739,911 | 12/1929 | McMurray | 220/314 |
| 1,758,909 | 5/1930 | Coffin | 220/298 |
| 1,870,973 | 8/1932 | Thwaits | 220/244 |
| 2,183,282 | 12/1939 | Rike | 220/246 |
| 2,260,752 | 10/1941 | Marasso | 220/244 |
| 2,457,927 | 1/1949 | Scadder | 220/325 |
| 2,589,795 | 3/1952 | Gary | 220/314 |
| 2,599,072 | 6/1952 | Schweiso | 220/316 |
| 2,629,514 | 2/1953 | Savolainen | 220/314 |
| 3,208,758 | 9/1965 | Carlson et al. | 277/187 |
| 3,365,096 | 1/1968 | Muehl | 220/314 |
| Re. 24,543 | 9/1958 | Bilderback | 220/298 |

FOREIGN PATENT DOCUMENTS

| 603,163 | 8/1960 | Canada | 220/314 |
|---|---|---|---|
| 692,704 | 11/1930 | France | 220/246 |

*Primary Examiner*—William Price
*Assistant Examiner*—Alian N. Shoap
*Attorney, Agent, or Firm*—C. Michael Zimmerman

[57] ABSTRACT

A door for an ultra-high vacuum chamber is disclosed which includes a sealing joint that maintains a hermetic seal when it is baked or otherwise subjected to high temperatures, while yet allowing an operator to have quick access into the interior of the chamber. The quick access door includes a vacuum flange adapted to be conventionally secured to a corresponding flange circumscribing an access port of a vacuum chamber. The door vacuum flange has a conical sealing surface about its inner periphery, and the door includes a sealing disc designed to hermetically mate therewith. That is, the sealing disc has a circumferential conical skirt providing a sealing edge and is mounted on a support arm which is selectively securable across the opening to position the sealing disc in front of the access opening. A drive arrangement is provided for moving the sealing disc from a retracted position adjacent the arm to a registering position in which such sealing disc closes the opening and engages the flange sealing surface. The drive further axially compresses the seal disc into the opening to generate stored energy in the disc which causes it to expand peripherally as necessary to accommodate any differential thermal expansion between the seal disc and the flange which otherwise might result in a vacuum leak.

9 Claims, 5 Drawing Figures

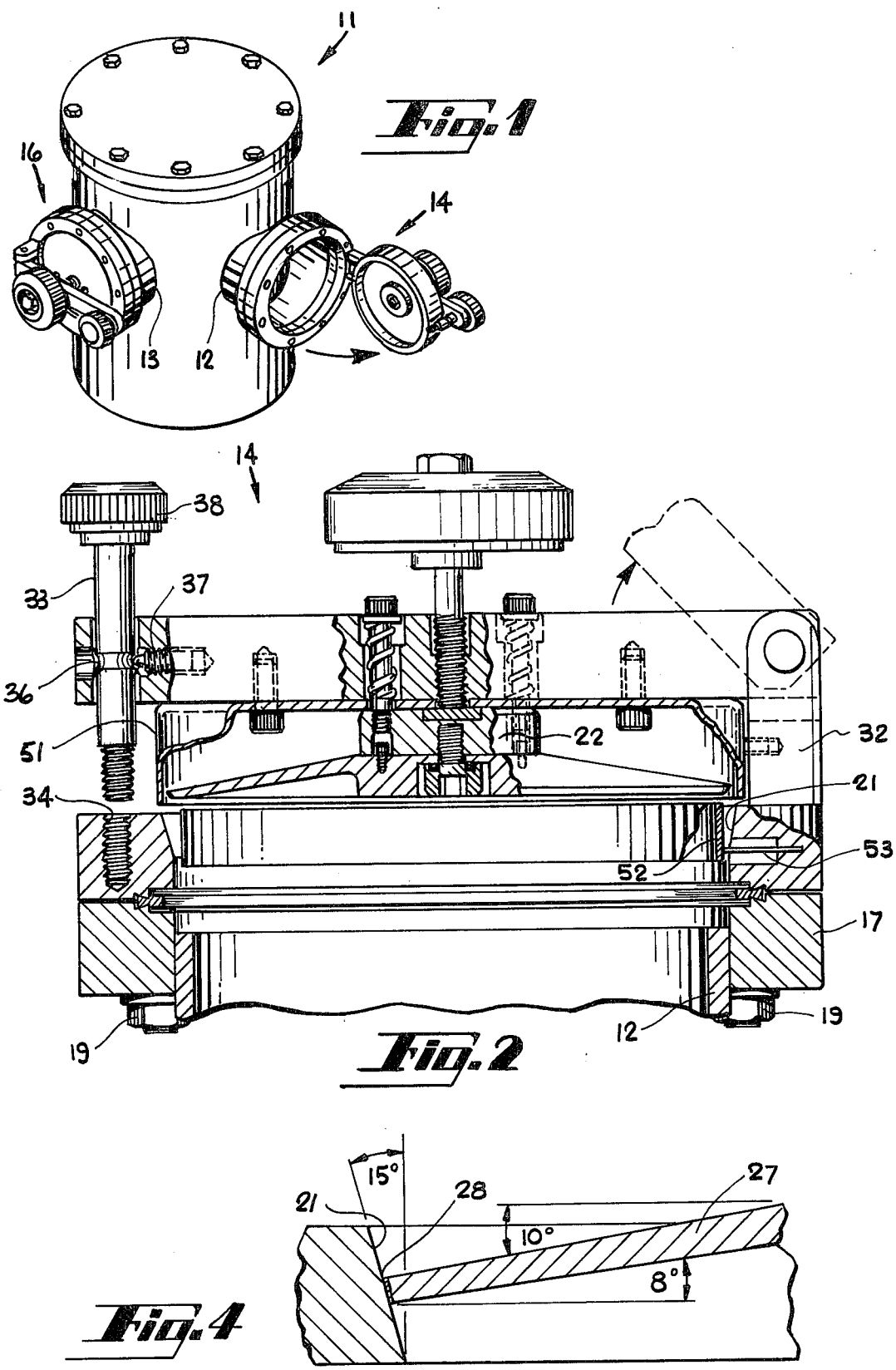

HIGH TEMPERATURE, QUICK ACCESS DOOR FOR HIGH VACUUM CHAMBERS

BACKGROUND OF THE INVENTION

This invention relates to high vacuum components and, more particularly, to a door for an ultra-high vacuum chamber or the like which can be baked or otherwise subjected to high temperatures without leaking, and yet provides quick and simple access to the chamber. There are many uses to which high and ultra-high vacuum systems, i.e., systems capable of producing and maintaining vacuums of $10^{-6}$ torr or higher, are put in which it is necessary or desirable to raise the temperature of various ones of the system components up to 250° C. or more. For example, it is often necessary in order to achieve a desired ultra-high vacuum that the vacuum chamber be out-gassed by baking. Also, components of ultra-high vacuum furnaces must be capable of withstanding a high furnace temperature without the integrity of the vacuum being adversely affected. It will be recognized that the seals where various components of the system are joined together are particularly vulnerable to leaks. However, vacuum joints have been designed and developed which solve the majority of such problems. For example, the vacuum joint described and claimed in U.S. Pat. No. 3,208,758 is widely used to create a good hermetic seal between vacuum members, such as flanges, which are bolted together. With use of a metal gasket, such a joint is bakeable or, in other words, capable of withstanding high temperature operations and cycling without either out-gassing or leaking.

Neither the vacuum joint arrangement described above nor other vacuum joints now available are really suitable, however, for use with doors for chamber access ports which require continual use. In this connection, generally all of such vacuum joints require the use of a multitude of closely spaced bolts or the like around the periphery of the seal to develop the relatively high and uniform pressure between the joint members required for a vacuum-tight seal capable of withstanding high temperature baking. It will be recognized that the necessity of removing and then reapplying such bolts whenever it is desired to have access through a vacuum port protected by such a seal makes access through such a port a relatively long and tedious process. The increasingly wide usage of ultra-high vacuum systems for batch processing in the integrated circuit field, surface research, and high temperature applications has added impetus to the need for quick and relatively easy access into a bakeable vacuum chamber.

SUMMARY OF THE INVENTION

The present invention provides a door for a vacuum chamber which is capable of withstanding high temperatures without either out-gassing or otherwise adversely affecting the integrity of the vacuum, while yet providing relatively quick access to the vacuum chamber with a minimum of operation. In its basic aspects, the high temperature, quick access door of the invention includes a rim which circumscribes with a bakeable sealing surface an opening in a high vacuum chamber or the like to be closed, and a sealing disc for closing such opening which includes a circumferential skirt providing a bakeable peripheral sealing edge adapted to mate hermetically with the bakeable sealing surface of the rim. As a salient feature of the invention, the door also includes a support arm for the sealing disc which is selectively securable across the opening to support the door in front of the opening, and means mounting the sealing disc on the support arm for collectively moving the same between a registering position in which the sealing disc closes the opening with its sealing edge hermetically engaging the sealing surface and a retracted position in which the door is spaced from the opening and its sealing edge is disengaged from the sealing surface.

Most desirably, the bakeable sealing surface provided by the rim circumscribing the port opening essentially has the shape of a right circular conical section which tapers inwardly away from the sealing disc; and the circumferential skirt of the disc providing the sealing edge is also a right circular section of a cone which is coaxial with the conical sealing surface on the rim, but which tapers in the opposite direction. The means mounting the sealing disc on the support arm in such an arrangement also includes a drive means for applying a force to the door when it is in its registering position with the sealing surface, which force, because of the opposed conical shapes of the sealing surface and sealing disc, will apply axial compression to the door to generate peripheral expansion thereof in the plane of the opening so that the disc sealing edge will engage the sealing surface of the rim with a sealing pressure which will accommodate any differential thermal expansion between the disc and the sealing surface without a leak being formed. In this connection, both the bakeable sealing surface and the bakeable sealing disc are most desirably metals having substantially the same thermal coefficient of expansion in the temperature range to which it is expected the door seal to be subjected. Moreover, to assure that the sealing edge and sealing surfaces are not unintentionally struck or otherwise damaged during access through the chamber opening, a shield arrangement is included for protecting both of the same whenever the door is in its open position.

The invention includes other features and advantages which will be described or will become apparent from the following more detailed description of preferred embodiments of the invention.

BRIEF DESCRIPTION OF THE DRAWING

With reference to the accompanying two sheets of drawing:

FIG. 1 is an isometric view of a typical ultra-high vacuum chamber having a pair of high temperature, quick access doors of the invention on access ports thereof;

FIG. 2 is an enlarged, elevation view with portions broken away of a preferred high temperature, quick access door of the invention, said door being illustrated with the sealing disc out of engagement with the sealing surface and with a door open position indicated by phantom lines;

FIG. 4 is a partial, further enlarged view illustrating the manner in which the sealing edge of the sealing disc of the embodiment of FIGS. 1-3 engages the sealing surface to provide a vacuum joint having the desired high integrity.

DETAILED DESCRIPTION OF THE PREFERRED EMBODIMENT

Figure 3:
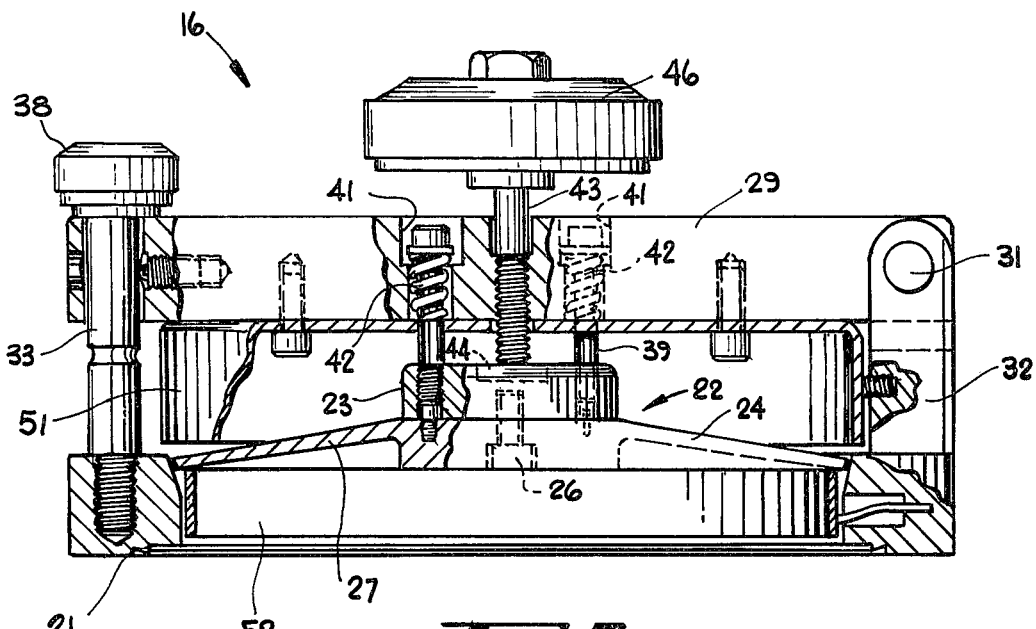
FIG. 3 is an elevation view similar to FIG. 2 but illustrating the embodiment of such figure in its sealing position.
Figure 5:
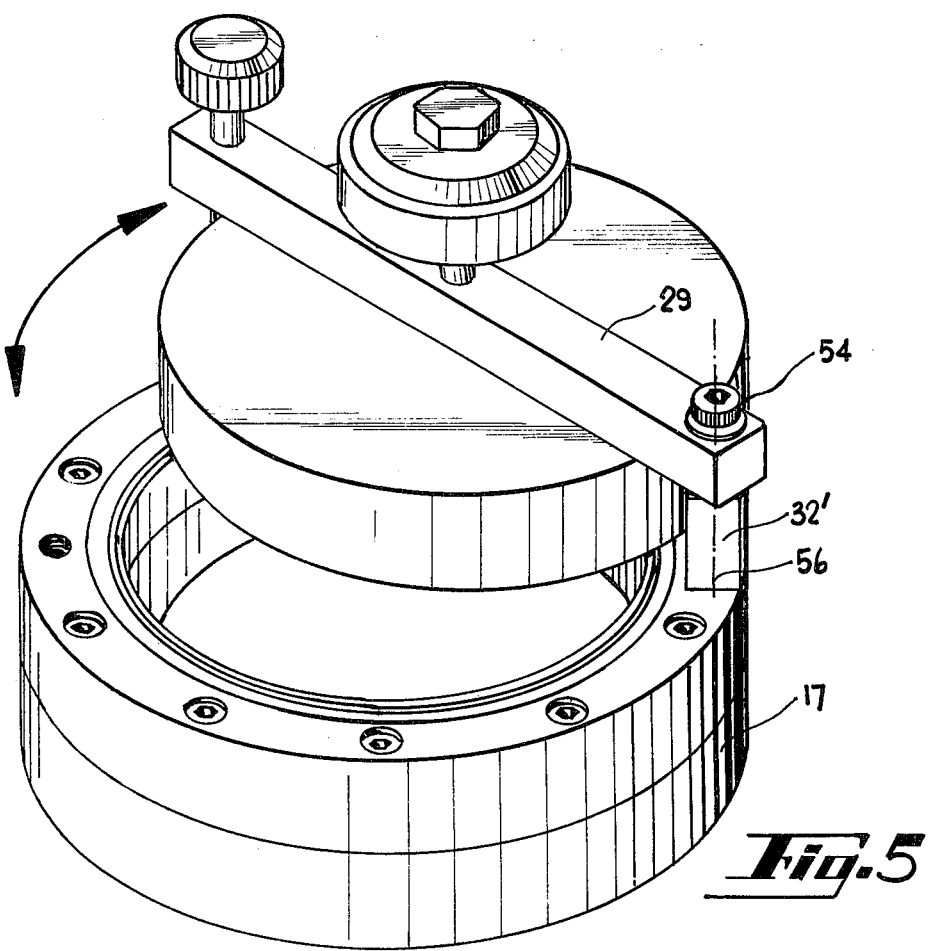
FIG. 5 is an isometric view of a second preferred embodiment of the high temperature, quick access door of the invention.

With reference first to FIG. 1, a typical ultra-high vacuum chamber of the type used for surface research, for example, is generally referred to by the reference numeral 11. Such chamber includes a pair of access ports 12 and 13 which respectively have a pair 14 and 16 of quick access doors incorporating the invention. The doors 14 and 16 are the same — the door 14 being shown fully open to permit access into the interior of the chamber and the door 16 being illustrated in the closed position.

Each of the doors 14 and 16 is adapted to be conventionally mounted onto a port of a vacuum chamber. In this connection, each of the ports 12 and 13 terminates, as is usual, in a high vacuum mounting flange 17. The door of the invention includes a corresponding comparable mounting flange 18 which is circumferentially secured to the corresponding flange 17 on the chamber by, for example, a plurality of nut and bolt combinations 19 equally spaced about their periphery. The joint between the flanges 17 and 18 is suitably sealed for high temperature operation in a conventional manner, e.g., by the sealing construction described in the aforementioned U.S. Pat. No. 3,208,758. It is the combination of the seal design with the force generated by the nut and bolt combinations 19 which is responsible for a high integrity seal between the access port and the door structure. It will be recognized that with this particular mounting construction the door of the invention can be mounted to ports of existing high vacuum chambers without requiring alteration in the design of such chambers.

Reference is now made to FIGS. 2 through 4 for a more detailed description of a preferred embodiment of the door of the invention. As illustrated, the previously mentioned flange 18 acts, in effect, as a rim which circumscribes the access opening into the chamber with a conical sealing surface 21. For best results in high temperature operation, the flange 18 and, hence, sealing surface 21 is a metal, e.g., stainless steel. It should be noted that the conical surface is a right circular section of a cone which tapers inwardly in a direction away from the sealing disc 22.

The sealing disc 22 includes a central mounting block 23 to which a sealing plate 24 is rigidly secured via a seal bolt 26 or the like. The plate 24 includes a circumferential skirt 27 (that portion of the plate which extends radially outward beyond the mounting block 23), which skirt terminates in a peripheral sealing edge 28 adapted to mate hermetically with the sealing surface 21 provided by the flange 18. In this connection, the sealing disc is also desirably of a metal with, if desired, a soft metal plating, such as one of gold, on the sealing edge itself to flow within any interstices at the seal joint which might otherwise create a high vacuum leak. Details of the manner in which the sealing disc and rim sealing surface coact to provide a high temperature, hermetic seal will be described hereinafter.

The sealing disc 22 is mounted on a support arm 29 which is selectively securable across the access opening to support such sealing disc in front of the opening. More particularly, a first end of the support arm 29 is pivotally secured to the flange 18 on one side of the opening by being pinned via a hinge pin 31 between a pair of upwardly projecting ears on a support post 32 extending upwardly from flange 18. With such a pivotal securance, the support arm 29 and the sealing disc mounted thereon are pivotable as indicated in phantom in FIG. 2 between a position in front of the chamber access opening to a position outwardly away from the opening to facilitate access through the chamber opening. The pivot axis provided by the hinge pin 31 lies in a plane parallel to the plane of the opening so as to provide such pivotable motion of the arm and sealing disc inwardly toward and outwardly away from the opening.

The opposite end of the support arm 29 is selectively securable to, and detachable from, the diametrically opposed side of the opening. That is, a lock bolt 33 extends through such end and is threadably receivable within a registering bore 34 which extends into the flange 18 at a position which is diametrically opposed to the support post 32. As can be seen by comparing FIGS. 2 and 3, the lock bolt 33 is slidably and rotatably received within its associated end of the support arm for movement between a retracted position in which the arm end with which it is associated is free and an extended position in which it threadably engages the bore 34 to prevent pivotal movement of the arm away from the access opening. As illustrated, the bolt 33 includes a circumferential groove 36 which is engaged by a ball plunger 37 when the bolt is in its retracted position so as to maintain the same in such position. Moreover, the bolt includes a knurled knob 38 at its head for facilitating manual grasping and rotation of the bolt for threading and unthreading the same into and from the bore 34.

When the support arm 29 is secured across the opening as illustrated in FIG. 3, the sealing disc is maintained in a position coaxial with the opening to be closed. Means are provided mounting the sealing disc on the support arm for selective movement between a retracted position as shown in FIG. 2 in which the door is spaced from the opening and a registering position as shown in FIG. 3 in which the sealing disc closes the opening. Such means includes an arrangement for resiliently urging the sealing disc into its retracted position, and a drive for overcoming such resilient arrangement to force the sealing disc into its registering position. That is, a pair of support bolts 39 project upwardly from radially opposed positions on the mounting block 23 of the sealing disc into corresponding bores 41 in the support arm 29. As can be seen, each of the bolts 39 is a shoulder bolt which retains a spring 42 in compression between its head and a reduced diameter portion of its associated bore 41 adjacent the bottom surface of the arm 29. The compression springs 42 are designed and mounted to provide sufficient compressive force to normally resiliently urge the sealing disc 22 into engagement with the lower surface of the arm 29 as illustrated in FIG. 2.

The drive includes a thrust bolt 43 which is threadably engaged with the support arm centrally thereof and extends therethrough for engagement with the sealing disc 22. In this connection, the sealing disc is provided centrally with a thrust plate 44 against which the bolt 43 bears. The bolt 43 extends generally along the axis of the sealing disc and its path of movement, and includes an enlarged, knurled knob 46 to facilitate manual threading of the thrust bolt inwardly and outwardly of the arm 29. It will be recognized that inward threading of the thrust bolt will cause the same to engage the sealing disc 22 and force the same against the urging of the springs 42 from the retracted position shown in FIG. 2 to the position shown in FIG. 3 in which it registers with the access opening.

Because of the cooperating geometries and constructions of the rim sealing surface and the sealing disc, a hermetic seal capable of isolating an ultra-high vacuum from atmospheric pressure is obtained. The metal sealing surface 28 essentially has the shape of a right circular conical section which tapers away from the sealing disc, and the sealing disc has a diameter which is greater than the shortest diameter of the conical sealing surface 21. The result is that when the sealing disc is forced into the opening to be sealed, its peripheral sealing edge 28, shaped to conformably mate with the conical sealing surface 21, will engage such conical sealing surface. Most desirably, the skirt of the sealing disc also has a shape of a right circular conical section, which is coaxial with conical sealing surface 21 but which tapers in the opposite direction.

The axial force provided by the thrust bolt against the sealing disc will, because of the geometries, become a sealing force or pressure between the sealing edge of the disc and the sealing surface, having a mechanical advantage determined by the angle of the conical surfaces. That is, such mechanical advantage will include not only that due to the inclined plane arrangement formed by the conical sealing surface 18, but will also include the inclined plane mechanical advantage inherent in including a conical skirt on the sealing disc as described. FIG. 4 provides a relatively schematic representation of the coaction of the sealing disc with the conical surface 21. It has been found empirically that adequate results are obtained with the angular relationships shown. That is, the conical sealing surface preferably has a taper of about 15° to the conical axis or, in other words, is taken from a cone having an apex angle of about 30°. Although the upper and lower surfaces of the skirt have differing tapers as will be discussed below, the average taper is about 9° to the horizontal or, in other words, the conical section defined thereby is taken from a cone having an apex angle of about 162°. With these angular relationships, the mechanical advantage provided by the inclined sealing surface is approximately 3.7:1, whereas the mechanical advantage provided by the conical skirt of the sealing disc is approximately 5:1. The total mechanical advantage of the sealing disc and inclined plane force system is approximately 18.7:1. This mechanical advantage will be added to the mechanical advantage inherent in the screw thrust bolt arrangement 43, to provide a sufficiently high sealing pressure between the sealing surface and the sealing edge of the disc to resist any chance of leakage at ultrahigh vacuums. In this connection, as mentioned before, the sealing edge of the sealing disc is most desirably plated or otherwise covered with a relatively soft metal which will flow under the sealing pressures to fill any irregularities in the joint.

As another feature of the invention, the sealing arrangement of the invention is designed to accommodate the thermal expansions expected during high temperature cycling operation and the like, without damage to the integrity of the vacuum. In this connection, most desirably, both the sealing disc 22 and the flange 18 providing the conical sealing surface 21 are of metals, with the coefficient of thermal expansion of the sealing disc being at least equal to, and preferably slightly greater than, the coefficient of thermal expansion of the flange sealing surface. The result is that thermal expansion will not adversely affect the vacuum seal. Suitable materials are stainless steel for the flange and copper alloy No. 172, an alloy of copper and beryllium, for the sealing disc. Besides such materials having the desired thermal coefficient of expansion relationship, both have good heat conductivity to assure that, because of their contact at the seal joint, they are generally at the same temperature.

The ability of the joint of the door to accommodate thermal effects is also enhanced by the construction of the sealing disc. That is, because of the coaxial conical sections discussed above at the sealing joint, when the thrust bolt 43 applies force to the disc after it has reached the registering position, such force will axially compress the same toward the opening, thereby generating, in effect, stored energy in the disc which will cause the same to expand peripherally parallel to the plane of the opening to engage the sealing edge and sealing surface with sealing pressure irrespective of slight differential thermal expansion between such disc and the flange sealing surface which might tend to separate the two. Most desirably, the disc reacts to the compressive force provided by the thrust bolt by flexing somewhat. The shape and material of the disc are appropriately chosen to this end. More particularly, to facilitate such flexing, and assure that it is appropriately distributed radially over the sealing disc skirt, the thickness of such skirt decreases radially outwardly of the disc. The disc therefore has strong structural strength adjacent its center where the thrust bolt is applied thereto, while yet having flexibility adjacent the sealing edge where it is desired. The previously mentioned beryllium-copper alloy has the desired flexibility.

FIG. 4 illustrates the thickness taper of the disc. This thickness taper is responsible for the differing conical tapers of the upper and lower surfaces of such disc. As an example of an appropriate taper, in one embodiment in which the disc is made of the aforementioned beryllium-copper alloy and the circumferential skirt has a radial extent of 2⅛ inches from the mounting block 23 to the sealing edge, the skirt decreases in thickness from ⅛ inch at the mounting block to 1/16 inch at its sealing edge.

As another salient feature of the invention, means are provided for protecting the flange sealing surface and the sealing edge of the disc whenever they are not forming a sealing joint. In this connection, it will be recognized that unless such protection is provided, there is a significant chance that one or both of the sealing parts making up the joint might be inadvertently scored or otherwise damaged in a manner which would adversely affect the capability of the same to form a hermetic seal. This is especially true if the door is being used with a chamber access opening through which parts being processed are periodically inserted or removed from the chamber. Such means includes for the sealing disc's peripheral sealing edge, a protective, inverted cup shield 51 which is supported by and depends downwardly from the support arm 29. As illustrated, such cup shield 51 has a sufficient diameter and depth to receive the sealing disc when it is in its retracted position to thereby circumscribe and enclose the sealing edge.

A hoop shield 52 is secured to the flange 18 in a manner in which it will automatically protect the sealing surface 21 whenever the sealing disc 22 is not in engagement therewith. To this end, the hoop 52 has a diameter which is slightly less than the inner diameter of the flange 18, and is mounted resiliently on the flange at several locations spaced about its periphery by leaf spring arrangements which normally urge the hoop to a location shielding the sealing surface. One of such leaf spring arrangements is illustrated in FIGS. 2 and 3 and can be seen to include a leaf spring 53 which is positioned within a transverse bore in the inner periphery of the flange 18. As shown, the leaf spring 53 is rigidly secured between the flange 18 and the hoop shield 52 to normally position the hoop at the location illustrated in FIG. 2 at which it will provide protection for the sealing surface during access to the chamber through the opening. Because of the resilient mounting provided by the leaf springs, however, upon the sealing disc 22 being moved toward its registering position with the opening, it will engage the hoop and push it in front of it to expose the sealing surface for engagement by its sealing edge. FIG. 3 illustrates the hoop shield so engaged by the sealing disc and moved to a position exposing the sealing surface for engagement by the disc sealing edge.

Although the invention has been described primarily in connection with a preferred embodiment thereof, it will be appreciated that various changes and modifications can be made without departing from the spirit of the invention. For example, various of its features find utility separately, even though the combination provides optimum results. In this connection, there are many uses to which the door might be put in which the protective cup 51 and hoop shield 52 may not be required. In addition, changes can be made in the details of its various actuating and moving parts. For example, reference is made to FIG. 4 which shows an alternate manner in which the door can be moved away from the chamber opening to permit access to the latter. That is, the support arm 29' of such embodiment is pivoted on support post 32' for pivoting to the side of the opening, rather than outwardly away from the same. To this end, the arm is mounted by a cap screw 54, for example, to the top of the post 32' for pivoting about an axis 56 which is generally normal to the plane of the opening. In this embodiment, the heads of the bolts for the nut and bolt combinations which secure the flange 18' to the chamber flange 17 should be countersunk into the flange 18' in order not to provide a hindrance to free transverse pivoting of the door. In all other respects the embodiment of FIG. 4 is identical to the earlier described embodiment and its details will therefore not be repeated.

Because of the various changes and modifications which can be made without departing from the spirit and scope of the invention, it is intended that the coverage afforded applicant be limited only by the claims and their equivalent language.

I claim:

1. A high temperature, quick access door for a high vacuum chamber and the like comprising:
    a rim circumscribing with a bakeable metal sealing surface an opening into a high vacuum chamber to be closed;
    a sealing disc for closing said opening having a bakeable metal peripheral sealing edge shaped to hermetically mate conformably with said brakeable sealing surface of said rim with a hermetic fit sufficient to separate a vacuum of $10^{-6}$ torr within said chamber from atmospheric pressure;
    a support arm for said disc selectively securable across said opening to support said disc in front of said opening in position for registry therewith;
    means mounting said sealing disc on said support arm for selective movement between a registering position in which said sealing disc closes said opening with its sealing edge hermetically engaging said sealing surface and a retracted position in which said disc is spaced from said opening and its sealing edge is hermetically disengaged from said sealing surface, said mounting means including drive means for applying force centrally to said disc when it is in said registering position to hermetically engage said sealing edge of said disc with said sealing surface of said rim, the skirt of said disc providing said sealing edge being generally a right circular section of a cone tapering inwardly away from said opening when it is supported by said support arm in front of said opening, whereby upon said drive means applying said force to said disc it applies axial compression of said disc into said opening to generate peripheral expansion of said disc in the plane of said opening and hermetically engage said sealing edge and said sealing surface with high vacuum sealing pressure;
    a protective cup shield mounted on said support arm to circumscribe and enclose said sealing edge of said sealing disc when said sealing disc is in said retracted position; and
    a hoop shield secured on said rim for protecting said sealing surface thereof during access to said high vacuum chamber through said opening when said door is open.

2. The high temperature, quick access door of claim 1 wherein said hoop shield is mounted resiliently on said rim for normal position at said location shielding said sealing surface during access to said chamber through said opening, which hoop shield is responsive to said sealing disc moving into said registering position by exposing said sealing surface for engagement thereof by said sealing edge of said disc.

3. A high temperature, quick access door for a high vacuum chamber and the like comprising:
    a rim circumscribing with a bakeable metal sealing surface an opening into a high vacuum chamber to be closed;
    a sealing disc for closing said opening having a bakeable metal peripheral sealing edge shaped to hermetically mate conformably with said bakeable sealing surface of said rim with a hermetic fit sufficient to separate a vacuum of $10^{-6}$ torr within said chamber from atmospheric pressure;
    a support arm for said disc selectively securable across said opening to support said disc in front of said opening in position for registry therewith;
    means mounting said sealing disc on said support arm for selective movement between a registering position in which said sealing disc closes said opening with its sealing edge hermetically engaging said sealing surface and a retracted position in which said disc is spaced from said opening and its sealing edge is hermetically disengaged from said sealing surface, said mounting means including drive means for applying force centrally to said disc when it is in said registering position to hermetically engage said sealing edge of said disc with said sealing surface of said rim, the skirt of said disc providing said sealing edge being generally a right circular section of a cone tapering inwardly away from said opening when it is supported by said support arm in front of said opening, whereby upon said drive means applying said force to said disc it applies axial compression of said disc into said opening to generate peripheral expansion of said disc in the plane of said opening and hermetically engage said sealing edge and said sealing surface with high vacuum sealing pressure, and wherein the thickness of a circumferential skirt portion of said sealing disc decreases radially outward of said disc toward said sealing edge to provide said skirt portion with increasing flexibility toward said sealing edge for accommodating hermetic sealing engagement of said edge with said conical sealing surface under the action of said drive means.

4. A high temperature, quick access door according to claim 3 wherein a soft metal plating is provided between said sealing edge of said sealing disc and said bakeable sealing surface of said rim to form the hermetic engagement therebetween.

5. The high temperature, quick access door of claim 3 wherein said rim is provided by a high vacuum flange which is selectively securable to a comparable flange integral with said chamber surrounding said opening, said rim flange and said chamber flange having mating, bakeable, high vacuum seals.

6. The high temperature, quick access door of claim 3 wherein a first end portion of said support arm is pivotally mounted on one side of said opening and an opposite end portion thereof is selectively detachable from the diametrically opposed side of said opening, whereby said support arm and sealing disc are pivotable from in front of said opening when said sealing disc is in said retracted position.

7. The high temperature, quick access door of claim 6 wherein said first end portion of said support arm is pivotable about an axis lying generally in a plane parallel to the plane of said opening, whereby said support arm and sealing disc are pivotable outwardly away from said opening to facilitate access thereto.

8. The high temperature, quick access door of claim 6 wherein said first end portion of said support arm is pivotable about an axis which is generally normal to the plane of said opening, whereby said support arm and sealing disc are pivotable to the side of said opening to facilitate access thereto.

9. The high temperature, quick access door of claim 1 wherein the thermal coefficient of expansion of said disc is at least as great as the thermal coefficient of expansion of said sealing surface in the temperature range to which it is expected the door seal provided thereby to be subjected.

* * * * *